WILLIAM L. WILLIAMS.

Improvement in Attaching Hubs to Axles.

No. 122,506.  Patented Jan. 2, 1872.

No. 122,506

UNITED STATES PATENT OFFICE.

WILLIAM L. WILLIAMS, OF NEW YORK, N. Y.

IMPROVEMENT IN ATTACHING HUBS TO AXLES.

Specification forming part of Letters Patent No. 122,506, dated January 2, 1872.

*To all whom it may concern:*

Be it known that I, WILLIAM L. WILLIAMS, of the city and State of New York, have invented an Improvement in Attaching Hubs to Axles; and the following is declared to be a correct description thereof.

This invention is for relieving the nut that retains the pipe of the hub from concussion, and thereby lessening the risk of the nut becoming loose and shaking off, and at the same time a friction is produced that tends to hold the nut in position and prevent its unscrewing. This improvement is to be distinguished from the leather and other elastic washers introduced in the pipes of axles to retain the lubricating material. In my improvement the elastic material is only subjected to a direct pressure and not to wear and friction, and the nut is held from turning by friction due to compression of an India-rubber ring.

Figure 1:
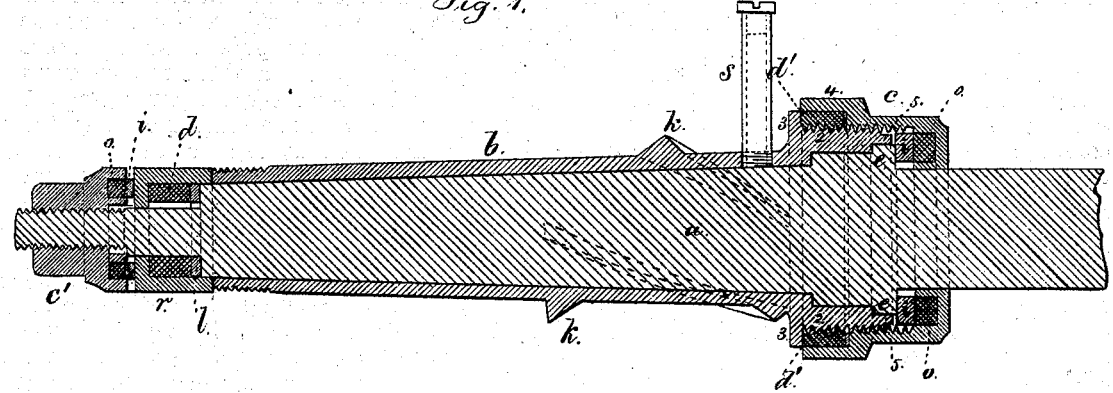
Figure 2:
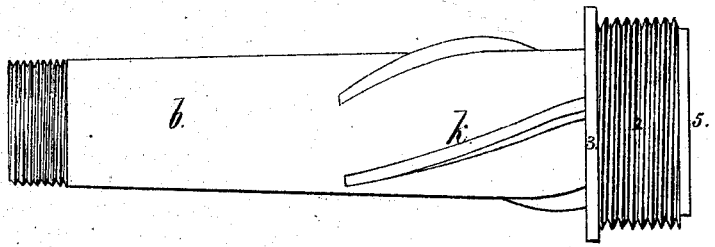

In the drawing, Figure 1 is a longitudinal section of the pipe and axle, and Fig. 2 is an elevation of the pipe separately.

The axle $a$ and pipe $b$ are to be of any ordinary size and character, but adapted to my improved attachment. The pipe $b$ is made with a screw, 2, at its inner end and a flange, 3. The nut $c$ screws upon 2, and has a cylinder, 4, inclosing between itself and the flange 3 the India-rubber ring $d'$, which is expanded as the nut $c$ is screwed up, thereby producing a sufficient friction upon the cylinder 4 of the nut $c$ to prevent said nut $c$ turning by concussion or jar in use. The screw-thread 2 may be removed adjacent to the flange 3, where the rubber ring $d$ is applied. Upon the axle $a$ is the collar $e$ to hold the hub in place, the nut $c$ being at the inner side thereof; but between said nut $c$ and collar $e$ is a metallic washer, $i$, and India-rubber washer $o$. Thereby the friction and wear of the collar is taken upon the metallic washer $i$ instead of the nut $c$, and any concussion of the hub is relieved by the washer $o$, of India rubber. In cases where the attachment for the hub is at the end of the axle, or where attachments are provided at both ends of the pipe $b$, the parts are arranged as represented. The nut $c'$ screws upon the end of the axle $a$, and contains a recess for the elastic washer $o$ and the metallic washer $i$, and they serve the same purposes as they do in connection with the nut $c$. In order to employ the rubber ring $d$ I inclose the same in the cylinder $r$, that bears against the washer $i$ at one end, and against the pipe $b$ at the other end, and the compression of the rubber ring $d$ gives the friction necessary for preventing the cylinder $r$ turning; but a feather or flattened portion of the axle may be made use of, and a washer, $l$, should be introduced between the shoulder of the axle $a$ and the rubber $d$. The screw at the end of the box $b$ is turned, leaving the plain cylinder 5, so that the pressure or concussion applied in driving the pipe $b$ into the hub shall not injure the screw-thread. The tube $s$ with a screw-cap is employed as a convenient means for lubrication, and said tube is to pass through the wooden portion of the hub. The surface of the pipe $b$ is provided with inclined ribs $k$ $k$, forming screw-sections, that serve to hold the pipe more firmly in the hub than the straight ribs heretofore employed. The cylinder $r$ is set up by the nut $c'$ as the parts wear, and the rubber $d$ prevents the parts binding or shaking loose in use.

I claim as my invention—

1. The elastic ring $d'$ confined between the flange 3 on the pipe $b$ and the nut $c$ so as to be expanded against the cylindrical portion 4 of said nut $c$, and thereby retain the nut and prevent its working loose, as set forth.

2. The elastic rubber washer $o$ in a recess in the nut, protected by the washer $i$, as and for the purposes set forth.

3. The cylinder 5 at the end of the pipe $b$ for protecting the screw 2 in forcing the pipe into the hub as set forth.

4. The inclined ribs $k$ upon the outside of the pipe $b$, for the purposes set forth.

5. The cylinder $r$ abutting against the end of the box $b$, and having a flange between the elastic ring $d$ and nut $c$ so as to confine said ring $d$, as set forth.

Signed by me this 5th day of October, A. D. 1871.

W. L. WILLIAMS.

Witnesses:
GEO. T. PINCKNEY,
CHAS. H. SMITH.

(31)